May 23, 1944.    E. A. KEELER    2,349,437
MEASURING AND CONTROL APPARATUS
Filed Jan. 7, 1941
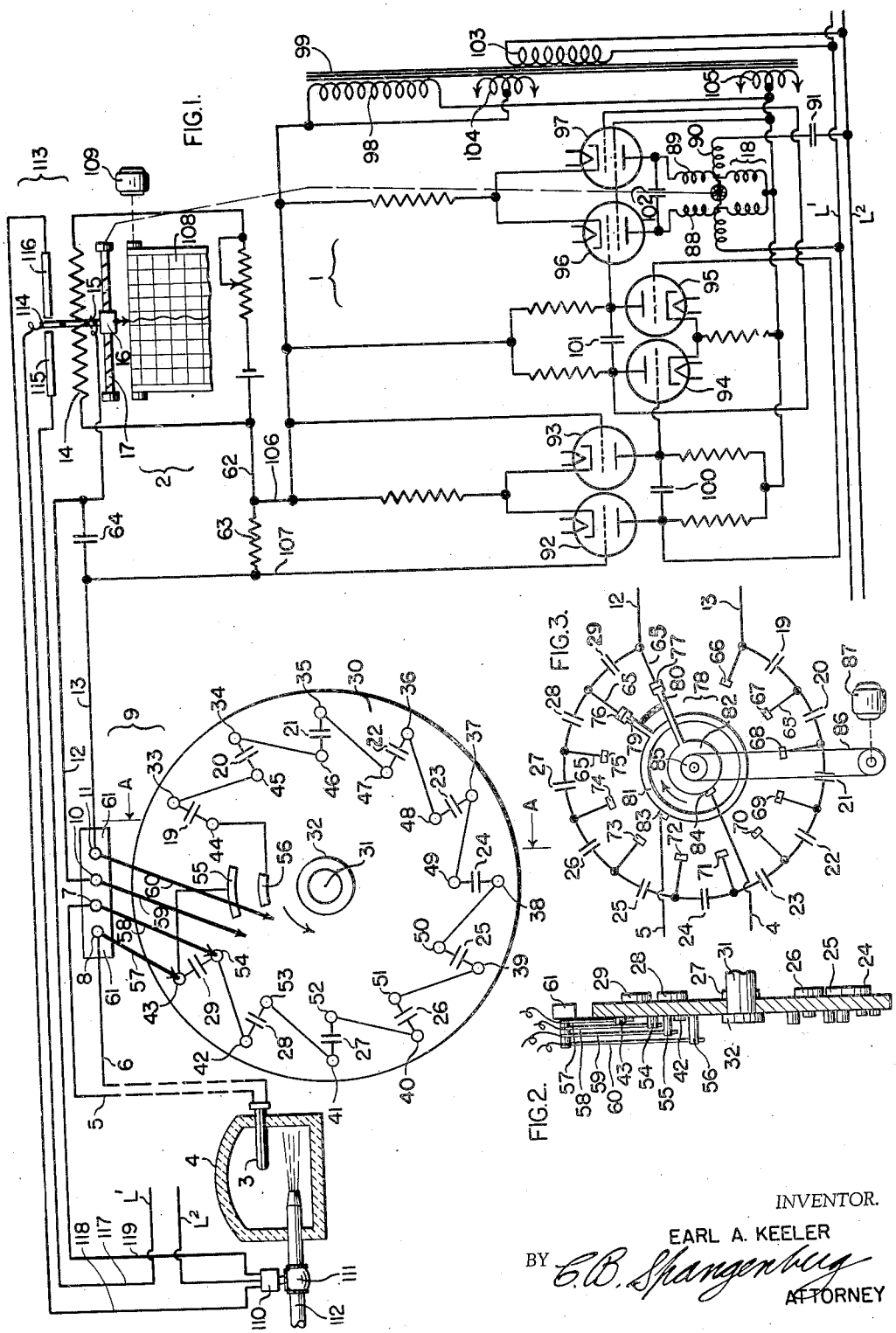
INVENTOR.
EARL A. KEELER
BY C.B. Spangenberg
ATTORNEY Patented May 23, 1944

2,349,437

UNITED STATES PATENT OFFICE 2,349,437

MEASURING AND CONTROL APPARATUS

Earl A. Keeler, Norristown, Pa., assignor to The Brown Instrument Company, Philadelphia, Pa., a corporation of Pennsylvania Application January 7, 1941, Serial No. 373,450

8 Claims. (Cl. 171—95)

The present invention relates to measuring and controlling systems and more particularly to systems involving the measurement and/or recording of direct electromotive forces of minute magnitude and their utilization for control purposes.

An object of the invention is to provide a method of measuring and/or recording the variations in magnitude of direct electromotive forces of minute magnitude.

Another object of the invention is to provide a method of utilizing the variations in magnitude of minute direct electromotive forces to control the operation of electromechanical mechanism.

A further object of the invention is to provide rugged and highly accurate apparatus for indicating and/or recording direct electric current or potential variations of minute magnitude and/or for utilizing such variations for control purposes.

A still further object of the invention is to provide indicating, recording and/or controlling apparatus employing a novel arrangement for magnifying small direct electromotive forces into electromotive forces of appreciably increased magnitude, the latter of which may be utilized to control the operation of electromechanical mechanism without requiring the use of complicated or critically adjustable amplifiers.

A further object of the invention is to provide improved apparatus for measuring and/or recording the magnitude of direct electromotive forces of minute magnitude which inherently is stable in operation and does not overrun or hunt.

A special object of the invention is to provide improved apparatus for indicating, recording and/or controlling temperature conditions.

Various devices have been utilized in the prior art for measuring the magnitude, or the departure from a given magnitude, of minute direct electromotive forces. One of the most satisfactory of such devices from the standpoint of accuracy and reliability is the so-called potentiometer recorder. In such devices the minute direct electromotive forces are utilized directly to effect deflection of the movable element of a galvanometer or other similar sensitive instrument. This movable element, in turn, is employed to control the operation of motive means such, for example, as mechanical relay mechanism or electromechanical mechanism for rebalancing the potentiometer upon unbalance thereof.

Such prior art devices have certain disadvantages which are avoided by the use of the present invention. In the first place they are relatively expensive since they require the assembly and adjustment of a sensitive galvanometer having a delicate, deflectable element, or similar mechanism. Such galvanometer mechanisms furthermore materially curtail the ruggedness of the instrument as a whole and introduce limitations therein. For example, unless the galvanometer is of the "dead beat" type it tends to oscillate around its ultimate control position. So-called "dead beat" galvanometers on the other hand, require a considerable time interval before complete deflection is obtained, and are therefore unsuitable for use in apparatus designed to record rapid variations in a variable condition.

Accordingly, a feature of the present invention is to provide a potentiometer-type recorder which is free from the limitations of the galvanometer-control type. In carrying out this and other desirable features of the present invention the minute direct electromotive force to be measured is appreciably magnified by what may be termed an electromechanical amplifier, and the magnified quantity is employed directly to control the operation of electromechanical mechanism for rebalancing the potentiometer.

Specifically, it is contemplated in accordance with the present invention to individually charge suitable energy storing devices, such as electrical condensers, in succession by means of the electromotive force which is to be measured, and to provide means for connecting the energy storing devices in series thereby magnifying, or in effect multiplying, the said electromotive force. By providing a suitable number of energy storing devices, the electromotive force to be measured may thus be magnified to a value which is capable of being readily amplified by suitable electronic amplifying means, and capable of being utilized to directly control the operation of electromechanical mechanisms such as a reversible electrical motor without requiring the use of sensitive and delicate galvanometer mechanisms. Thus, one of the most serious difficulties in the measurement of minute direct electromotive forces with ordinary electronic amplifying means is overcome. While the minute electromotive force is itself incapable of being amplified accurately and reliably by means of ordinary electronic amplifying systems, the electromotive force obtained by suitable magnification of the minute electromotive force under measurement may be readily amplified by ordinary electronic amplifying systems and thereby may be utilized to directly control the operation of rugged electromechanical mechanism.

A further feature of the present invention is to provide such improved apparatus for measuring the magnitude, or the departure from a given magnitude, of a minute direct electromotive force which includes means for applying the said electromotive force to unbalance a normally balanced electrical network and thereby to initiate operation of a driving system having inertia to effect a rebalancing adjustment of the network, which means inherently includes suitable provisions for so delaying the application of the full change or variation in said electromotive force in unbalancing the electrical network that the inertia of the driving system is compensated for and hunting or oscillation of the said system about the balance point is prevented. The delaying provisions are of such character that the operation of the driving system is effective substantially immediately in effecting rebalance of the network whereby the operation of the driving system will be proportional to the extent of network unbalance. By employing such delaying provisions, the full extent to which the network will be unbalanced on a change in said electromotive force is not immediately applied to produce operation of the driving system, but is applied thereto in accordance with the inertia of said system to thereby compensate for such inertia and prevent hunting of said system. Thus, the driving system will decelerate as the full unbalance of the network is reduced and gradually eases into the balanced position without exceeding it.

The various features of novelty which characterize my invention are pointed out with particularity in the claims annexed to and forming a part of this specification. For a better understanding of the invention, however, its advantages and specific objects obtained with its use, reference should be had to the accompanying drawing and descriptive matter in which I have illustrated and described a preferred embodiment of the invention.

Of the drawing:

Fig. 1 is a diagrammatic representation of the use of the invention in a potentiometric recording and controlling system;

Fig. 2 shows a cross sectional view along the lines A—A of the "converter" illustrated in Fig. 1; and Fig. 3 illustrates an alternative form of "converter" that may be utilized in the arrangement of Fig. 1.

In Fig. 1 of the drawing there is illustrated in schematic form an arrangement including an electronic amplifier 1 for producing effects in accordance with the extent of unbalance of a potentiometer network 2 which controls the electronic amplifier and is unbalanced in accordance with the variations in a minute electromotive force to be measured, namely, that produced by a thermocouple 3, and in which because of the small magnitude of the electromotive force under measurement it is not practical nor desirable to have the said effects produced directly by said electromotive force.

More specifically, an arrangement is illustrated in the drawing for recording and controlling the temperature of a furnace 4 in the interior of which the thermocouple 3 is arranged in heating transfer relation therewith and is responsive to slight changes in temperature therein. The thermocouple 3, which may be located at a distance from the remainder of the apparatus, has its terminals connected by a pair of conductors 5 and 6 to the input terminals 7 and 8 of a device 9 which is provided for magnifying or multiplying the electromotive force derived from the thermocouple 3. The output terminals 10 and 11 of the device 9 are connected by conductors 12 and 13, respectively, to the terminals of the potentiometric network 2. The potentiometric network 2 includes a slidewire resistance 14 and an associated contact 15, which is capable of being moved along the length of the slidewire, and may be of any suitable type, for example, such as the Brown potentiometric network disclosed in Patent 1,898,124 issued to T. R. Harrison February 21, 1933.

The movable contact 15 of the potentiometer is attached to a suitable carrier which, for example, may be in the form of an internally threaded nut 16 adapted to ride on a screw threaded rod 17 which is rotated in one direction or the other under control of the electromotive force produced by the thermocouple 3. A suitable motor 18 is coupled in any convenient manner to the screw threaded rod 17 to rotate the latter at the desired speed and in the desired direction and thereby to move the contact 15 along the slidewire resistance 14 to rebalance the potentiometer when the latter is unbalanced.

As illustrated in Fig. 1 and in Fig. 2 which shows a cross section of the converter 9 along the lines A—A of Fig. 1, the device 9 comprises a plurality of energy storing units 19—29, here shown for purposes of illustration as condensers, which are connected in series. The condensers 19—29 are suitably mounted on a disc 30 which is mounted for rotation on a shaft 31, being rigid therewith, and is composed of suitable insulating material. A flange 32 is provided on the shaft 31 for supporting the disc 30. The shaft 31 is mechanically connected to the shaft of a suitable motor (not shown) and is adapted to be rotated at a suitable speed in a counterclockwise direction.

One terminal of each of the condensers 19—29 is connected to a respective terminal 33—43 which is individual thereto and are circumferentially disposed on the disc 30. The other terminal of each of the condensers 19—29 is connected to a respective terminal 44—54 which is individual thereto and are also circumferentially disposed on the disc 30. The terminals 33—43 are disposed on a circle having the shaft 31 as its center and the terminals 44—54 are disposed on a circle, of smaller diameter than the first mentioned circle, also having the shaft 31 as its center. The terminals 33—43 and 44—54 for each individual condenser are disposed on a radial line passing through the center of the circles and may be circular in cross section as shown or, if desired, may be arcuate in cross section. As shown in Fig. 2, the terminals 44—54 project further from the surface of the disc 30 than do the terminals 33—43.

The disc 30 is also provided with a pair of arcuate contact segments 55 and 56 which are disposed on a radial line intermediate the condensers 19 and 29 and at different distances from the shaft 31. The distances from the shaft 31 to the contacts 55 and 56 are preferably shorter than the distance from the shaft 31 to the contacts 33—54. The contacts 55 and 56 are disposed between the contacts 33, 44 and 43, 54, which as seen in Fig. 1 are positioned at greater distances apart than are the other pairs of contacts.

As shown in Fig. 2 the condenser units 19—29 may desirably be mounted on the side of the disc 30 opposite to that from which contacts 33—57 project.

The device 9 includes a flexible contact member 57 which is disposed in operative relation with the contacts 33—43 and is adapted to successively engage the latter as the disc 30 is rotated and also includes a flexible contact member 58 which is disposed in operative relation with the contacts 44—54 and is adapted to successively engage the latter as the contact member 57 engages the contacts 33—43 in succession. Similarly, flexible contact members 59 and 60 are disposed in operative relation with the contacts 55 and 56, respectively and are adapted to engage the said contact associated therewith once during each rotation of the disc 30. The flexible contact members 57—60 are insulated from each other and are supported by a stationary block 61 composed of suitable insulating material.

In operation, as the disc 30 is rotated, the flexible contacts 57 and 58 come successively into contact with the pairs of contacts associated with each of the condensers 19—29 to thereby impart a charge to each of the condensers of a value ultimately corresponding to the magnitude of the electromotive force produced by the thermocouple 3. After all of the condensers 19—29 have been charged, the flexible contact members 59 and 60 are moved into engagement with the contacts 55 and 56, respectively, and thereby connect the condensers in series to the terminals of the potentiometer network 2 through a connection which may be traced from the contact 55 to the flexible contact member 59, terminal 10 on block 61, conductor 12, contact 15 and slidewire 14 of potentiometer 2, a conductor 62 in which a resistance 63 of suitable value is inserted, conductor 13, terminal 11, flexible contact member 60, contact 56 and the condensers 19—29 in series to the contact 55. Thus, the sum of the individual electromotive forces applied to each of the condensers 19—29 is applied to the terminals of the potentiometer. As will be apparent the summation of the individual electromotive forces on the condensers 19—29 is appreciably larger than that produced by the thermocouple 3, being approximately equal to the electromotive force produced by the thermocouple 3 multiplied by the number of condensers 19—29 employed. If desired, a condenser 64 may be connected between the conductors 12 and 13 so as to smooth out the electromotive force applied to the potentiometer 2 by the device 9.

It is noted that each of the condensers 19—29 may not be charged to the full value of the electromotive force produced by the thermocouple 3 upon the completion of a single revolution of the disc 30. As the disc 30 continues to rotate, however, each of the condensers 19—29 and thereby the condenser 64 will be repeatedly charged and consequently each of the condensers 19—29 will ultimately be charged to the full value of the thermocouple electromotive force. The extent to which each of the condensers 19—29 is charged on each revolution of the disc 30 depends upon the length of time the flexible contact members 57 and 58 are in engagement with their associated contacts, and thereby upon the speed of rotation of the disc.

While only eleven condenser units have been shown in the device 9 illustrated in the drawing, it will be apparent that the number of condenser units employed is dictated solely by the magnification of the thermocouple electromotive force desired. It will be apparent, moreover, that any suitable contacting device may be substituted for the device 9 as long as the desired operation is obtained therewith, namely the consecutive charging of a plurality of the condenser units, and thereafter, the connection of all of the condenser units in series to the terminals of the potentiometer 2.

In Fig. 3 I have illustrated, more or less diagrammatically, an alternative form of electromotive force magnifying device which may be utilized in lieu of the device 9 in the arrangement of Fig. 1, and in which the energy storing devices or condensers need not be mounted on a rotating part as in the arrangement of Fig. 1, but instead may be maintained stationary. In Fig. 3 parts corresponding to those shown in Figs. 1 and 2 have been indicated by the same reference numerals. As illustrated the electromotive force magnifying device shown in Fig. 3 comprises a plurality of condenser units 19—29 which are continuously connected in series with the conductors 12 and 13 and thereby are continuously connected in series to the terminals of the potentiometer network 2. Connections 65 extend between the common terminal of adjacent condenser units 19—29 and terminate in circumferentially disposed terminals 66—77. A rotary contacting device 78 is provided which comprises two contacting arms 79 and 80 which are so positioned with respect to the terminals 66—77 that any two of the said terminals, except the terminals 66 and 77, may be bridged by the arms 79 and 80. Upon rotation of the device 78 the contacting arms 79 and 80 consecutively bridge successive pairs of the contacts 66—77 except the pair of contacts 66, 77.

The contacting arms 79 and 80 are formed of conducting material and are connected to and are rigid with slip rings 81 and 82, respectively. Brushes 83 and 84 bear upon the rings 81 and 82, respectively, and serve to connect the conductors 5 and 6 from the thermocouple 3 to the contacting arms 79 and 80.

The rotation of the device 78 may be accomplished in any convenient manner, for example, through the medium of a pulley 85, a belt 86 and any suitable operating means here shown as a continuously rotating unidirectional motor 87.

As the device 78 rotates in the direction indicated by the arrow, the contact arms 79 and 80 will consecutively engage successive pairs of the contacts 66—77 to thereby impart a charge to each of the condensers 19—29 in succession, which charge is of a value ultimately corresponding to the magnitude of the electromotive force produced by the thermocouple 3. After an entire revolution has been made, the contacting device 78 will repeat the above cycle of operations. It is thus apparent that the condensers 19—29 are continuously charged in consecutive relation with an electromotive force approximately equal to that produced by the thermocouple 3. It will be observed that the distance between the last terminal 77 and the first one 66 is greater than the distance between the contacts carried by the contact arms 79 and 80 and therefore in passing from the last condenser of the series to the first condenser thereof, the contacting arms 79 and 80 do not bridge the two terminals 77 and 66 which are connected to the potentiometer network 2.

While only eleven condenser units connected in series have been illustrated in Fig. 3 it will be apparent that any desired number of condenser units may be utilized and that the number employed is dicated solely by the magnification desired of the electromotive force produced by the thermocouple 3.

The electromotive force multiplying device illustrated in Figs. 1 and 2 and the alternative form illustrated in Fig. 3 operate to produce a magnified electromotive force from the minute electromotive force produced by the thermocouple 3, which magnified electromotive force is capable of being directly amplified by ordinary electronic amplifying means. This magnified electromotive force is opposed to the potential drop across the left hand portion of the slidewire resistance 14 of the potentiometer 2 and the unbalanced component of the electromotive forces is impressed on the input terminals of the electronic amplifier 1 which operates under control of said electromotive force to control the selective energization of one winding 88 or 89 of the reversible electrical motor 18 which, as shown, also includes a winding 90 connected to alternating current supply lines L¹ and L² through a suitable condenser 91.

The reversible motor 18 is of the induction variety and includes a squirrel cage rotor and two pairs of oppositely disposed field poles (not shown) on which the windings 88, 89 and 90 are wound. Winding 88 is wound on one field pole of one of said pairs and winding 89 is wound on the other pole of said pair. Winding 90 is wound on the other pair of field poles and due to the action of condenser 91 the current which flows through the winding 90 will lead the line current by approximately 90°. The current supplied the winding 88 by the amplifier 1 is in phase with the supply line voltage and establishes a field in the rotor which is displaced 90° in the forward direction with respect to that established therein by the winding 90. Similarly, the current supplied the winding 89 is in phase with the supply line voltage but since it is wound on an opposite field pole from that on which the winding 88 is wound it establishes a field in the rotor which lags by 90° that established by winding 90. Reaction between the field set up by winding 88 or 89 with that set up by winding 90 establishes a rotating field in the rotor which rotates in one direction or the other depending upon whether winding 88 and 89 is energized, and thus, on the direction of potentiometer unbalance. The motor rotor is connected through suitable gearing or couplings (not shown) to the screw threaded shaft 17 so that the contact 15 is adjusted along the slidewire resistance 14 in accordance with the direction of rotation of the rotor. The direction and duration of rotation of the rotor is controlled by the direction and extent of unbalance of the potentiometer 2 so that on motor rotation the contact 15 is adjusted in the proper direction to reduce the potentiometer unbalance.

The electronic amplifier 1 referred to and utilized for selectively controlling the rotation and direction of rotation of the reversible electrical motor 18 in response to unbalance of the potentiometer 2 includes a pair of electronic valves 92 and 93 which valves are heater type triodes including anode, cathode, filament and control electrode elements. The output circuits of the valves 92 and 93 are directly coupled to the input terminals of a like pair of valves 94 and 95. Valves 94 and 95 in turn have their output circuits directly coupled to the input terminals of a pair of electronic valves 96 and 97 the latter of which are heater type tetrodes including anode, cathode, filament, screen and control electrode elements, and have a respective motor winding 88 and 89 connected in their output circuits.

Anode voltage is supplied the amplifier from the high voltage secondary winding 98 of a transformer 99. As illustrated, valves 94 and 95 are connected across the terminals of said secondary winding in an inverse manner with respect to the connection of valves 92 and 93 and valves 96 and 97 thereacross. That is to say, the valves 92, 93 and 96, 97 and valves 94, 95 will be conductive only during alternate half cycles of the supply line voltage so that the conductivities of valves 94 and 95 will be controlled in accordance with the magnitude of current conducted by valves 92 and 93 during the preceding half cycle, and in like manner, the conductivities of valves 96 and 97 will be controlled in accordance with the current conducted by valves 94 and 95 during the preceding half cycle. As illustrated, condensers 100, 101 and 102 are provided for each pair of valves, being connected between the anodes of a respective pair of valves for effecting such control of a successive pair of valves during the next later half cycle. Transformer 99 is a combination step-up and step-down transformer and includes a line voltage primary winding 103, the high voltage secondary winding 98 and low voltage secondary windings 104 and 105. The low voltage winding 104 supplies energizing current to the heating filaments of valves 92, 93, 96 and 97 and similarly, winding 105 supplies energizing current to the heating filaments of valves 94 and 95, each of the filaments desirably being connected in parallel across its respective energizing winding. It is noted separate filament energizing windings 104 and 105 are provided because the potentials of the cathodes of valves 92, 93, 96 and 97 are widely displaced from that of the cathodes of valves 94 and 95.

The unbalanced terminals of the potentiometer 2 are connected by conductors 106 and 107 to the input terminals of the electronic valve 92 and consequently the conductivity of the latter is controlled in accordance with the state of balance of the potentiometer. When the potentiometer is balanced, the conductivity of the valve 92 will be precisely the same as the conductivity of the valve 93, and accordingly, the motor 18 will not be energized for rotation in either direction. Upon a change in the state of balance of the potentiometer, however, for example, upon unbalance of the potentiometer in the direction to increase the potential on the control grid of the electronic valve 92 in the negative direction with respect to the potential of the cathode, the conductivity of the valve 92 will be decreased with respect to the conductivity of the valve 93. This will operate to increase the conductivity of the valve 95 with respect to that of the valve 94 and thereby will operate to decrease the conductivity of the valve 96 with respect to that of the valve 97. Consequently, the current flow to the motor winding 89 will exceed the current flow to the winding 88, and as a result the motor will be energized for rotation. The direction of rotation is that required to restore the state of balance of the potentiometer 2. Upon unbalance of the potentiometer in the opposite direction, the conductivity of the valve 96, and accordingly the current flow to the motor winding 88 will be increased with respect to that in the motor winding 89. The motor will then be operated in the opposite direction, which direction is that required in this case to restore the state of balance of the potentiometer. The contact 15 will thus be adjusted to a position along the slidewire 14 which corresponds to the magnitude of the electromotive force produced by the thermocouple 3.

If desired, a pen may be mounted on the carriage which carries the potentiometer contact 15 and arranged in cooperative relation with a recorder chart 108 to thereby provide a continuous record of the temperature of the interior of the furnace 4 in which the thermocouple 3 is inserted. The chart 108 may be a strip chart as shown, and is adapted to be driven in any convenient manner as, for example, by a unidirectional motor 109 through suitable gearing (not shown) so that a record of the temperature to which the thermocouple 3 is subjected will be recorded as a continuous line on the chart.

It is noted that the measuring system illustrated in Fig. 1 and described hereinbefore includes suitable provisions for so delaying the application of the full change or variation in the electromotive force developed by the thermocouple 3 in producing unbalance of the potentiometer 2 that an effect is produced tending to compensate for the inertia of the driving system and thereby to prevent hunting or oscillation of the said system about the balance point. Precise compensation for the inertia of the driving system and thereby the minimization of hunting or oscillation of the system about the balance point may be obtained by suitably adjusting the magnitude of this effect. This effect may be adjusted in magnitude by suitably proportioning the total capacity of the condensers 19—29 connected in series and the speed of rotation of the disc 30 of Fig. 1, or the device 78 of Fig. 3, with respect to the value of the impedance of the potentiometer 2 and the resistance 63, and the speed of operation of the driving system including the rebalancing motor 18. When this proportion is suitably chosen, the speed of operation of the rebalancing motor 18 in effecting rebalance of the potentiometer 2 upon unbalance of the latter may be exceedingly great without overshooting of the balance point of the potentiometer 2 occurring and consequent hunting taking place.

With the arrangement illustrated in Fig. 1, for example, the thermocouple 3 operates to charge the condenser 64 through the medium of the device 9 and the electromotive force thus produced between the terminals of the condenser 64 is compared with the potentiometer electromotive force at the then position of the contact 15 along the slidewire 14. On a change in the electromotive force produced by thermocouple 3, for example, on an increase in that electromotive force, the device 9 will operate to increase the electromotive force produced between the terminals of the condenser 64 to a higher value corresponding to the increased value of the thermocouple electromotive force. Due to the nature of the device 9 and due to the presence of the resistance 63 connected across the potentiometer terminals, the electromotive force produced between the terminals of the condenser 64 will not immediately assume the final value corresponding to the new value of thermal electromotive force. This effect is obtained because the condensers 19—29 must be charged to the new value of the thermal electromotive force before the potential on the condenser 64 can assume its new value, which action introduces a delay and is further obtained because of the action of the resistance 63 in charging and discharging the condenser 64. Thus, until the potentiometer electromotive force is adjusted to a value corresponding to the new value of the thermocouple electromotive force, the electromotive force produced between the terminals of the condenser 64 will tend to assume a value intermediate that produced between the contacts 55 and 56 by the condensers 19—29 and the potentiometer electromotive force.

There is no delay means in the circuit through which the potentiometer electromotive force and the electromotive force produced on condenser 64 are opposed so that the amplifier 1 responds substantially immediately to unbalance of these electromotive forces to energize the motor 18 for rotation in one direction or the other to change the potentiometer electromotive force as required to reduce the unbalance and reduces the motor energization to zero at the instant the balance between the said electromotive forces is restored. Due to the inertia of the motor, however, the speed of the latter will not fall off as quickly as the energization thereof, and consequently the potentiometer electromotive force will overshoot the instantaneous value of the electromotive force on condenser 64. As a result, the potentiometer 2 will be momentarily unbalanced in the opposition direction, which unbalance will produce an effect energizing the motor for rotation in the reverse direction to thereby quickly decelerate the latter. Inasmuch as the electromotive force on the condenser 64 is intermediate that produced between the contacts 55 and 56 of the device 9 and the potentiometer electromotive force, the contact 15 will not have reached the position along the slidewire resistance 14 corresponding to the new value of thermocouple electromotive force at the instant when the potentiometer electromotive force and electromotive force on the condenser 64 were exactly balanced. After this temporary state of balance, the electromotive force on the condenser 64 will not assume the value corresponding to that between the contacts 55 and 56 until the lapse of a predetermined interval required to charge the condenser 64 to the potential between the contacts 55 and 56, and by making this interval of the proper duration, the motor will be decelerated and ease the contact 15 gradually into the final position of balance without overshooting it. The proper adjustment of the duration of this interval may be readily effected by properly proportioning the total capacity of the condensers 19—29 with respect to the capacity of the condenser 64, the effective resistance of the potentiometer circuit and the resistance 63, and the speed of operation of the motor 18.

Thus, on a change in thermocouple electromotive force the motor will effect an adjustment of the contact 15 along the slidewire resistance 14, and closely adjacent the new position of balance of the potentiometer, the motor speed will be gradually decelerated and the latter will quickly come to rest with the contact 15 at the exact balance position. The motor 18 utilized for effecting rebalance of the potentiometer 2 may therefore be extremely fast in operation without overshooting and consequent hunting of the potentiometer taking place.

The same desirable operation may be obtained by utilizing the electromotive force magnifier illustrated in Fig. 3 in the arrangement of Fig. 1 in lieu of the device 9.

It will be apparent that the supply of heating agent to the furnace 4 may be controlled in accordance with the deflections of the recording pen along the chart 108. For example, a reversible electrical motor 110 having two opposed field windings (not shown) may be utilized to adjust a fuel valve 111 disposed in a pipe 112 which supplies fuel to the furnace 4. To this end the reversible motor 110 is energized for rotation in one direction or the other depending upon the direction of deflection of the pen from a predetermined position along the chart 108, which position corresponds to the temperature it is desired to maintain with the furnace 4.

Specifically, a switch 113 which is actuated in accordance with the adjustments of the recording pen is provided for controlling the energization of the motor 110. The switch 113 comprises a switch arm 114 which is insulated from but is carried by the same support which carries the pen and the potentiometer contact 15, and also two elongated contact segments 115 and 116 which are disposed on opposite sides of the arm 114. The arm 114 is connected by a conductor 117 to the alternating current supply conductor L¹. The contact segment 116 is connected by a conductor 118 in which one winding of the motor 110 is inserted to the alternating supply conductor L² and the contact segment 115 is connected by a conductor 119 in which the other winding of the motor 110 is inserted to the supply conductor L².

With the arrangement described, when the arm 114 is intermediate the contact segments 115 and 116 the motor 110 is not energized for rotation in either direction but when the arm 114 is in engagement with the contact segment 115 the motor 110 is energized for rotation in the direction to open the fuel valve 111 and thereby to increase the supply of fuel to the furnace 4. When the arm 114 is in engagement with the contact segment 116, the motor 110 is energized for rotation in the opposite direction and effects a closing adjustment of the valve 111 and thereby a decrease in the supply of fuel to the furnace.

Although not shown the contact segments 115 and 116 of the switch 113 are desirably made adjustable relatively to each other and to the chart 108 so that both the sensitivity and the control point setting of the apparatus may be adjusted in a manner well known in the art.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. The method of measuring the magnitude of a minute direct electromotive force which includes the steps of successively connecting said electromotive force to a plurality of electrical capacitive reactance devices to charge the latter, opposing the electromotive force produced by said devices connected in series to a known electromotive force, and varying said known electromotive force as required to effect a balance between said opposed electromotive forces.

2. The method of measuring the magnitude of a minute direct electromotive force which includes the steps of successively connecting said electromotive force to a plurality of electrical capacitive reactance devices to charge the latter, opposing the electromotive force produced by said devices connected in series to a known electromotive force, amplifying the resultant of said opposed electromotive forces, and applying the amplified quantity directly to effect a balance between said opposed electromotive forces.

3. Apparatus for measuring the magnitude of a minute direct electromotive force including a plurality of electrical capacitive reactance devices connected in series, a source of known electromotive force, switching means to alternately connect said electromotive force to each of said reactance devices in succession to charge the latter and to connect the electromotive force produced by all of said reactance devices in series in opposition to said known electromotive force, and means to vary said known electromotive force to balance said opposed electromotive forces.

4. Apparatus for measuring the magnitude of a minute direct electromotive force including a plurality of electrical capacitive reactance devices connected in series, an electrical energy storing device, switching means to alternately connect said electromotive force to each of said reactance devices in succession to charge the latter and to connect the total electromotive force produced by all of said reactance devices in series with said electrical energy storing device to charge the latter, a source of known electromotive force, means to oppose said known electromotive force to the electromotive force produced on said electrical energy storing device, motive means to vary said known electromotive force to balance said opposed electromotive forces, and means responsive to the resultant of said opposed electromotive forces to control said motive means.

5. Apparatus for measuring the magnitude of a minute direct electromotive force including a plurality of electrical capacitive reactance devices connected in series, an electrical energy storing device, switching means to alternately connect said electromotive force to each of said reactance devices in succession to charge the latter and to connect the total electromotive force produced by all of said reactance devices in series with said electrical energy storing device to charge the latter, a source of known electromotive force, means to oppose said known electromotive force to the electromotive force produced on said electrical energy storing device, means to amplify the resultant of said opposed electromotive forces, and means to apply the amplified quantity directly to effect a balance between said opposed electromotive forces.

6. Apparatus for measuring the magnitude of a minute direct electromotive force including a plurality of electrical capacitive reactance devices connected in series, an electrical energy storing device, switching means to alternately connect said electromotive force to be measured to each of said reactance devices in succession to charge the latter and to connect the total electromotive force produced by all of said reactance devices in series with said electrical energy storing device to charge the latter, an electrical network including a source of known electromotive force, means to connect said electrical energy storing device to said network to oppose the electromotive force produced thereon to said known electromotive force, motive means to adjust said network and thereby to vary said known electromotive force to balance said opposed electromotive forces, said motive means having the inertia characteristic which produces further adjustment of said network following deenergization, and means responsive to unbalance of said opposed electromotive forces to selectively energize said motive means for rotation in one direction or the other depending upon the direction of unbalance of said opposed electromotive forces, the value of said electrical energy storing device and the impedance of said network being so chosen with respect to the speed of operation of said motive means as to substantially compensate for the inertia characteristic of the latter.

7. Apparatus for measuring the magnitude of a minute direct electromotive force including a rotatable member, a plurality of electrical capacitive reactance devices carried by said member, a pair of contacts individual to and connected to opposite terminals of each one of said devices and carried by said member, another pair of contacts carried by said member, conductors connected to said first mentioned contacts to connect said devices in series between said another pair of contacts, first relatively stationary contact means disposed in operative relation with said first mentioned contacts adapted to connect said electromotive force to be measured to each of said devices to charge the latter, an electrical energy storing device, second relatively stationary contact means disposed in operative relation with said another pair of contacts and adapted to connect said devices in series to said energy storing device, said contacts being so disposed on said member that during one complete rotation of said member said electromotive force to be measured is connected in succession to said devices and thereafter said devices in series are connected to said energy storing device, means to continuously rotate said member, an electrical network including a source of known electromotive force, means to connect said electrical energy storing device to said network to oppose the electromotive force produced thereon to said known electromotive force, motive means to adjust said network and thereby to vary said known electromotive force to balance said opposed electromotive forces, said motive means having the inertia characteristic which produces further adjustment of said network following deenergization, and means responsive to unbalance of said opposed electromotive forces to selectively energize said motive means for rotation in one direction or the other depending upon the direction of unbalance of said opposed electromotive forces, the speed of rotation of said member, the value of said electrical energy storing device and the impedance of said network being so chosen with respect to the speed of operation of said motive means as to substantially compensate for the inertia characteristic of the latter.

8. Apparatus for measuring the magnitude of a minute direct electromotive force including a rotatable member, a plurality of electrical capacitive reactance devices carried by said member, a pair of contacts individual to and connected to opposite terminals of each one of said devices and carried by said member, another pair of contacts carried by said member, conductors connected to said first mentioned contacts to connect said devices in series between said another pair of contacts, first relatively stationary contact means disposed in operative relation with said first mentioned contacts and adapted to connect said electromotive force to be measured to each of said devices to charge the latter, an electrical energy storing device, second relatively stationary contact means disposed in operative relation with said another pair of contacts and adapted to connect said devices in series to said energy storing device, said contacts being so disposed on said member that during one complete rotation of said member said electromotive force to be measured is connected in succession to said devices and thereafter said devices in series are connected to said energy storing device, means to continuously rotate said member, and measuring means connected to said energy storing device comprising a source of known electromotive force, means to oppose the electromotive force produced across said electrical energy storing device to said known electromotive force, means to amplify the resultant between said opposed electromotive forces, and motive means directly controlled by the amplified quantity to vary said known source of electromotive force as required to balance said opposed electromotive forces.

EARL A. KEELER.